(12) United States Patent
Huwyler et al.

(10) Patent No.: US 11,215,127 B2
(45) Date of Patent: Jan. 4, 2022

(54) DYNAMIC VARIABLE FUEL OPTIMIZATION SYSTEM

(71) Applicant: Optimus Technologies, LLC, Pittsburgh, PA (US)

(72) Inventors: Colin N. Huwyler, Pittsburgh, PA (US); David S. Rosenstraus, Braddock, PA (US)

(73) Assignee: Optimus Technologies, Inc., Pittsburgh, PA (US)

( * ) Notice: Subject to any disclaimer, the term of this patent is extended or adjusted under 35 U.S.C. 154(b) by 351 days.

(21) Appl. No.: 15/296,341

(22) Filed: Oct. 18, 2016

(65) Prior Publication Data

US 2017/0037789 A1    Feb. 9, 2017

Related U.S. Application Data

(60) Division of application No. 14/540,637, filed on Nov. 13, 2014, now Pat. No. 9,995,225, which is a continuation-in-part of application No. PCT/US2013/040944, filed on May 14, 2013.

(60) Provisional application No. 61/903,605, filed on Nov. 13, 2013, provisional application No. 61/646,423, filed on May 14, 2012.

(51) Int. Cl.
| | |
|---|---|
| *F02D 19/06* | (2006.01) |
| *B67D 7/04* | (2010.01) |
| *G06Q 40/04* | (2012.01) |
| *B60R 16/023* | (2006.01) |
| *F02D 41/02* | (2006.01) |

(52) U.S. Cl.
CPC ...... *F02D 19/0634* (2013.01); *B60R 16/0236* (2013.01); *B67D 7/04* (2013.01); *F02D 19/0673* (2013.01); *F02D 41/029* (2013.01); *G06Q 40/04* (2013.01)

(58) Field of Classification Search
CPC .. F02D 19/06; F02D 19/0634; F02D 19/0636; F02D 19/066; F02D 19/085; F02D 19/087; F02D 19/088; B60K 2015/03019; B60K 2015/03348; B60K 2015/03355
See application file for complete search history.

(56) References Cited

U.S. PATENT DOCUMENTS

| | | | | |
|---|---|---|---|---|
| 8,240,277 | B1 * | 8/2012 | Michikawauchi | F02B 43/10 123/1 A |
| 2007/0119424 | A1 * | 5/2007 | Leone | F02D 19/081 123/461 |
| 2009/0194081 | A1 * | 8/2009 | Ito | F02B 69/02 123/575 |
| 2012/0239279 | A1 * | 9/2012 | Stuart | F02D 19/0623 701/107 |

* cited by examiner

*Primary Examiner* — Andrew D Stclair
(74) *Attorney, Agent, or Firm* — Babst Calland; Carl A. Ronald

(57) ABSTRACT

Present invention optimizes utilization of different fuels in various single and multi-fueled engines. The fuel system and optimization controller links fuel properties (physical, reactionary, combustion etc.) to on-board computer systems during the refueling process. This link enables fuel and additive producers an opportunity to optimize combustion parameters of their proprietary fuel blends to increase performance, fuel efficiencies and reduce emissions.

8 Claims, 16 Drawing Sheets

FUEL SPECIFIC DRIVER FEEDBACK

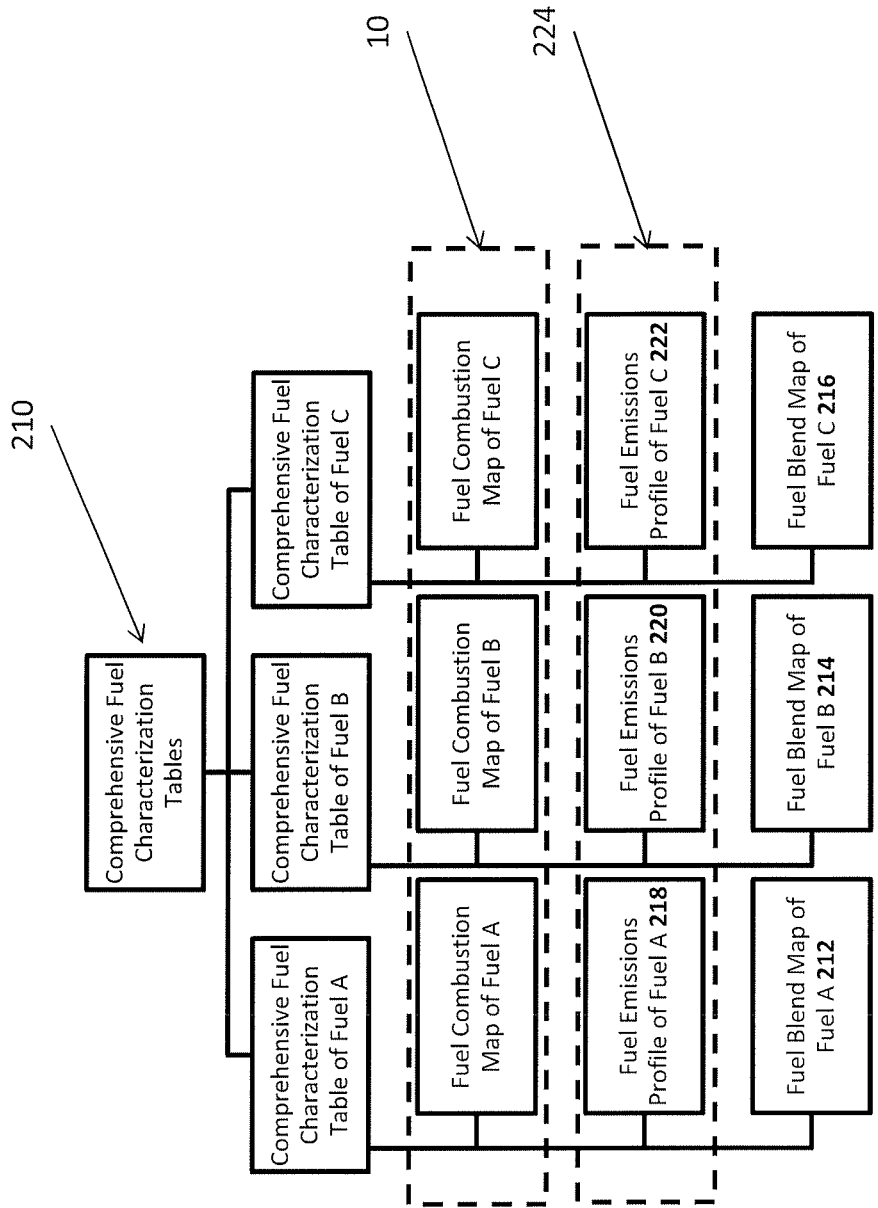
FIGURE 1A: Comprehensive Fuel Characterization Tables

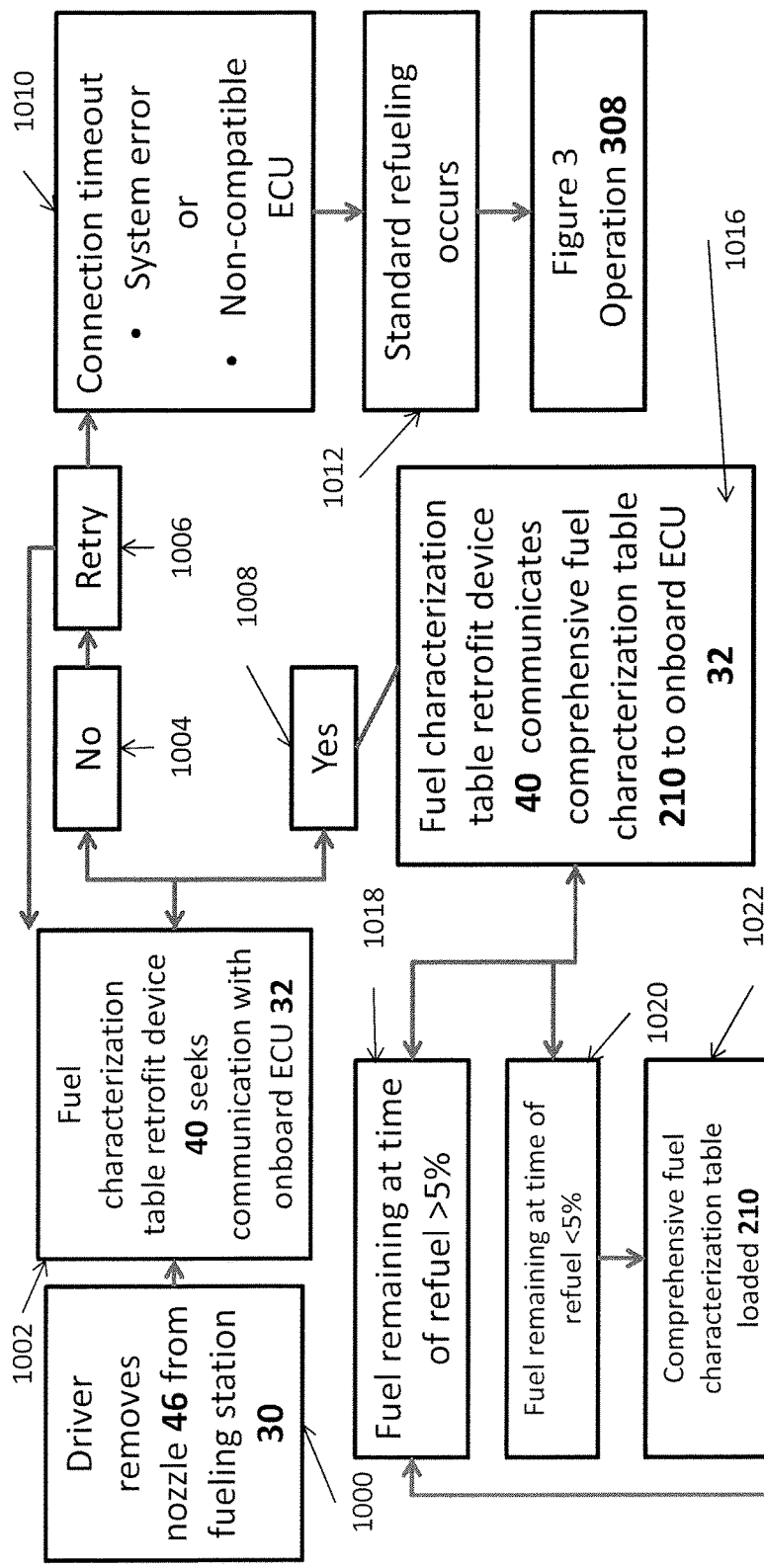
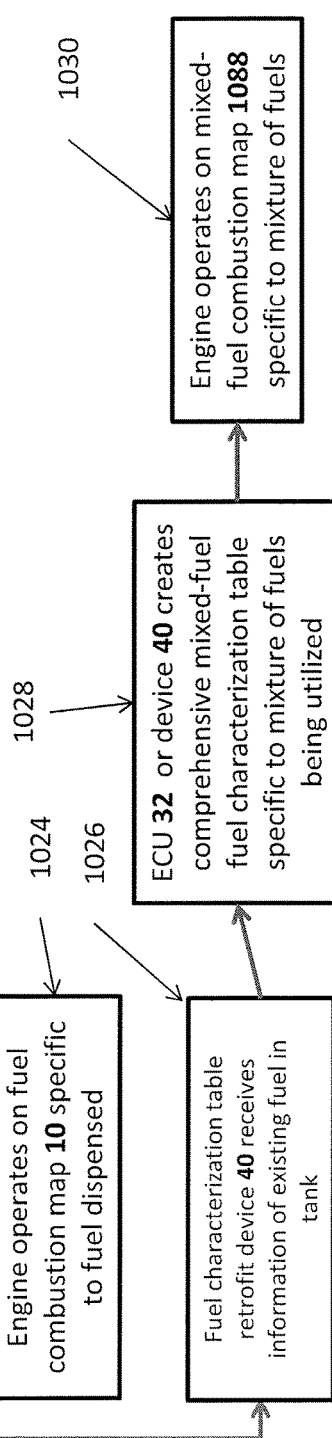
FIGURE 4: REFUELING FLOW CHART DETAILED

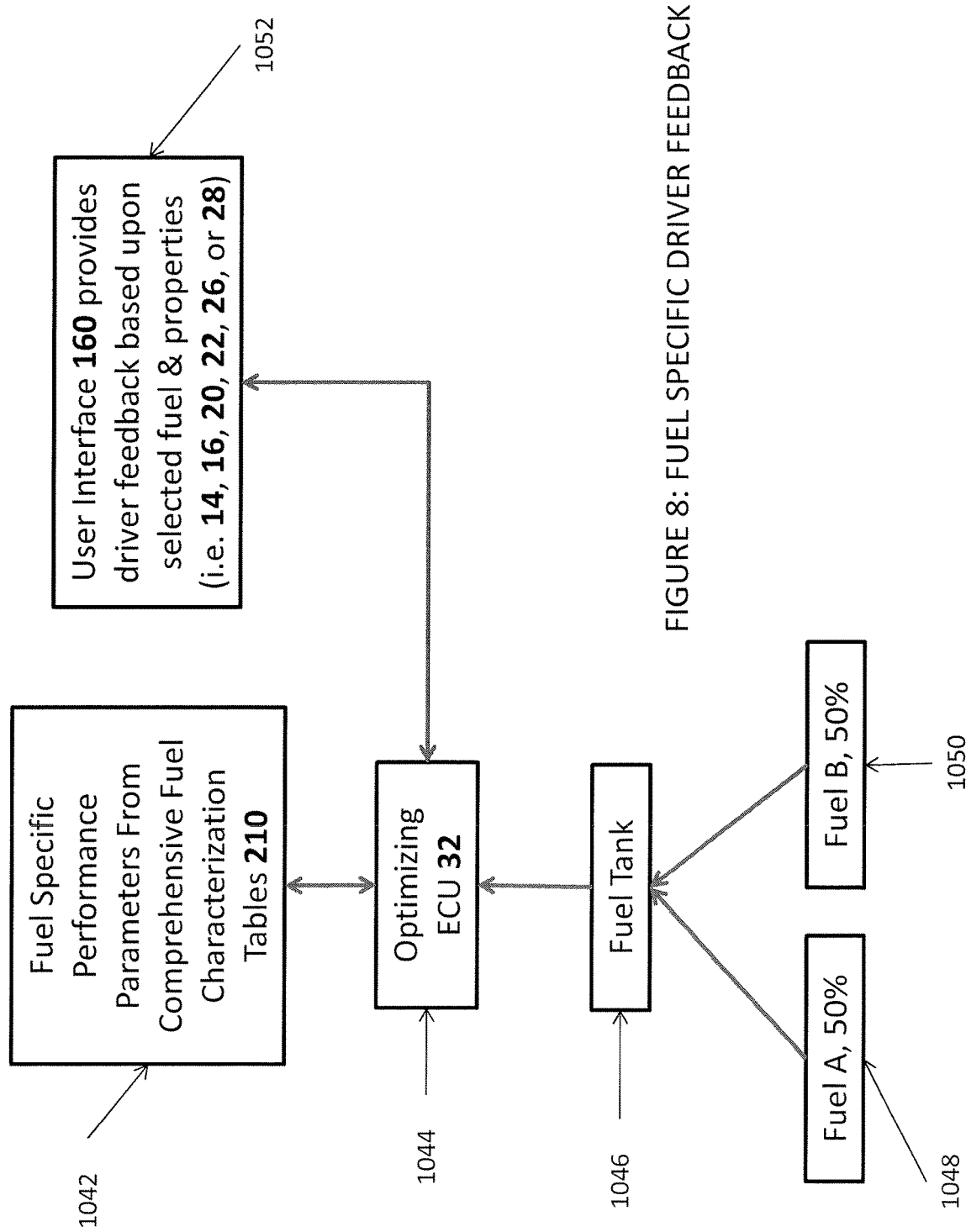
FIGURE 8: FUEL SPECIFIC DRIVER FEEDBACK

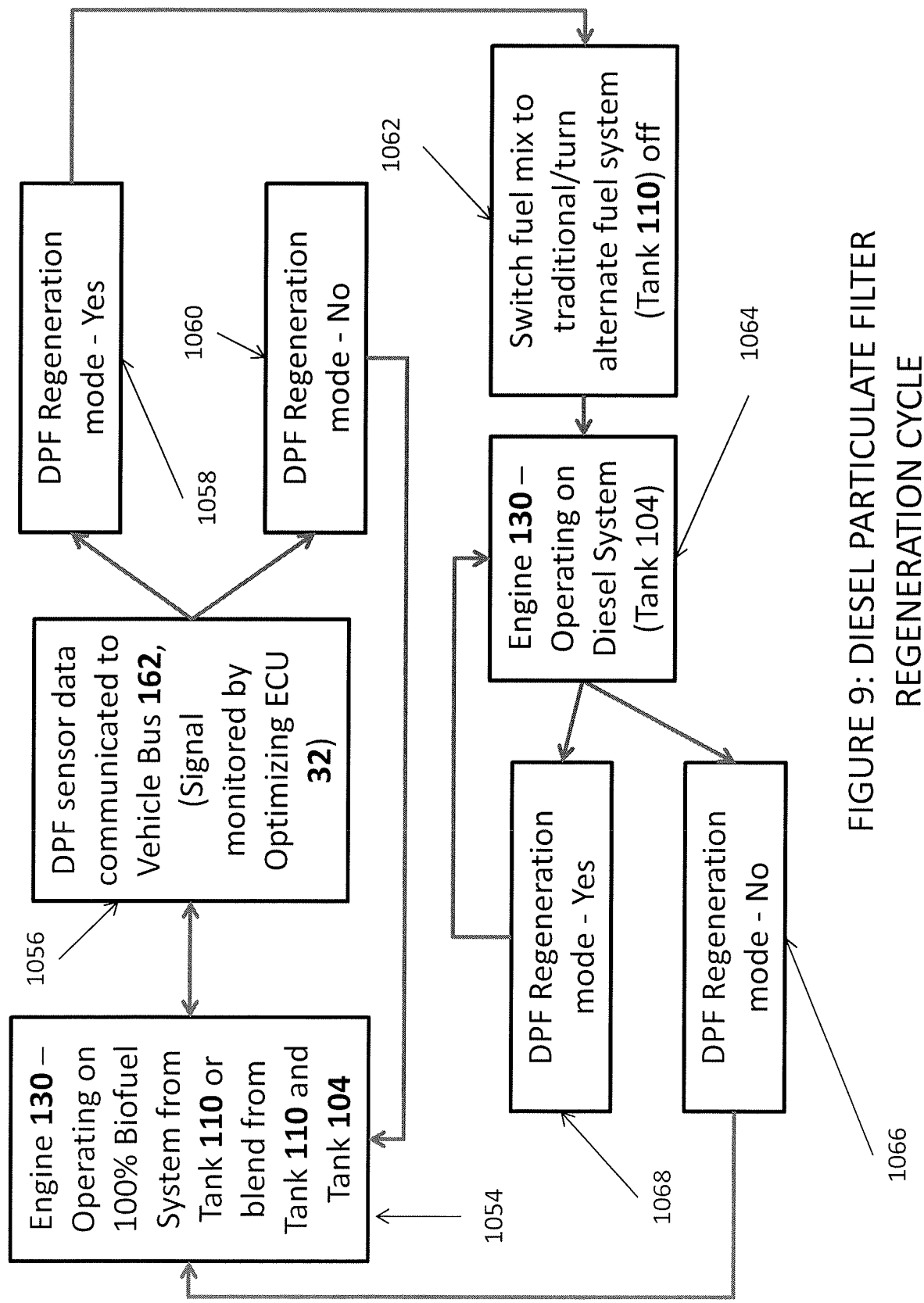
FIGURE 9: DIESEL PARTICULATE FILTER REGENERATION CYCLE

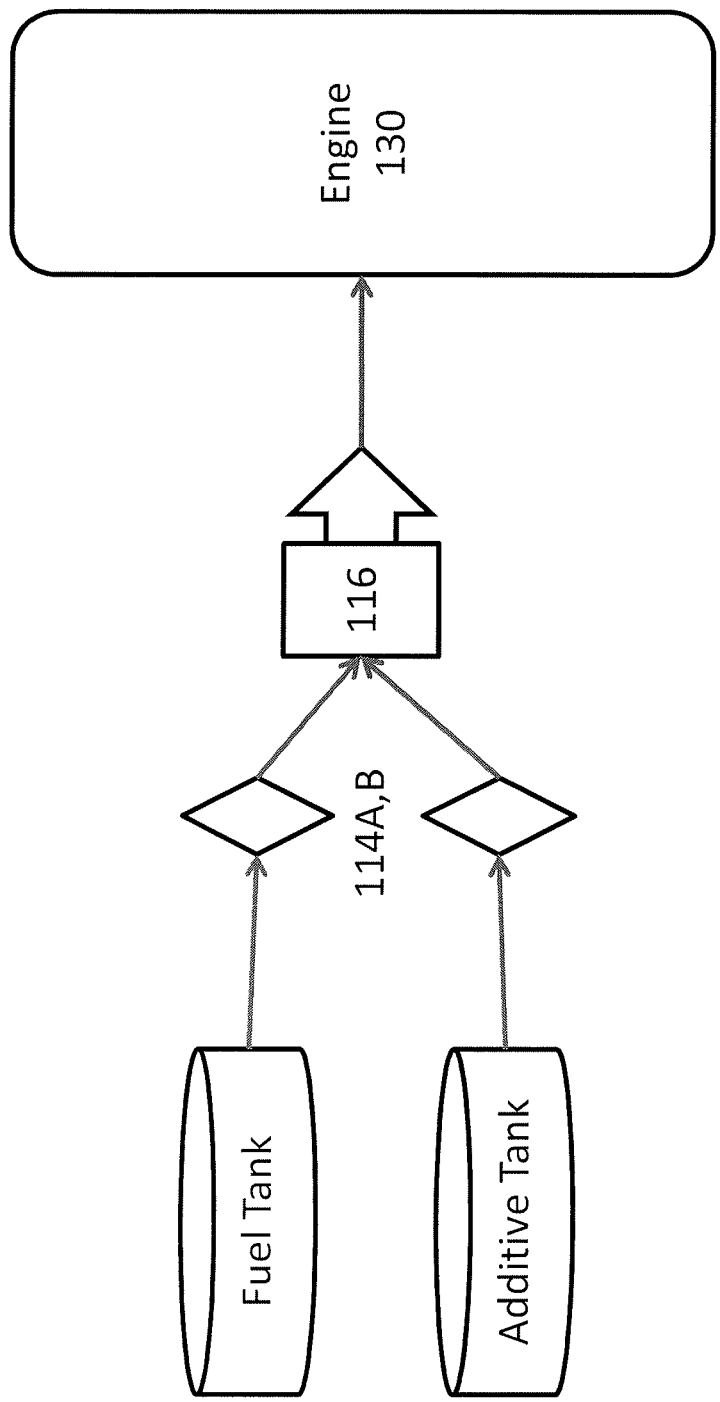
FIGURE 10: ADDITIVE MIXING CONFIGURATION

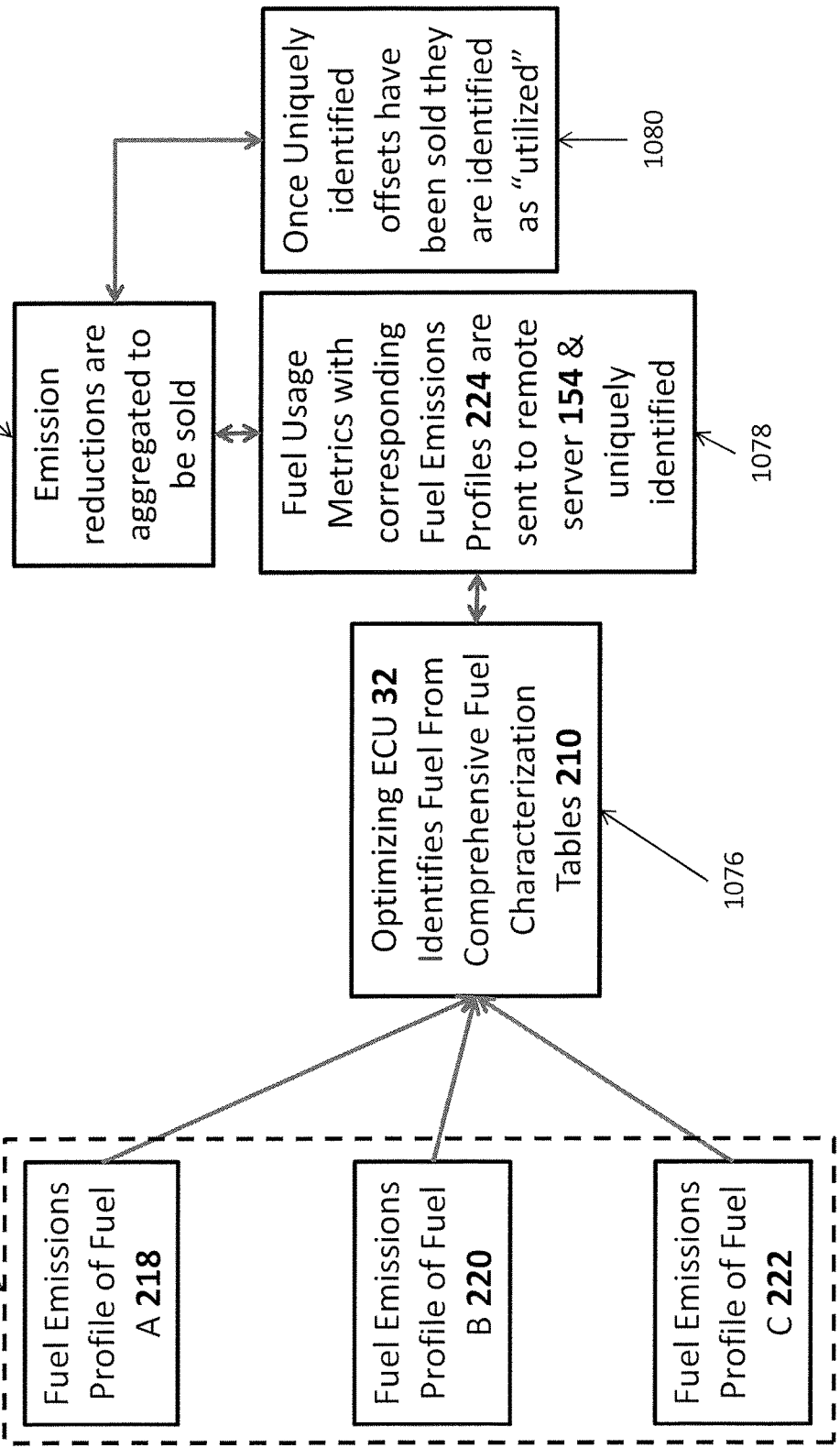

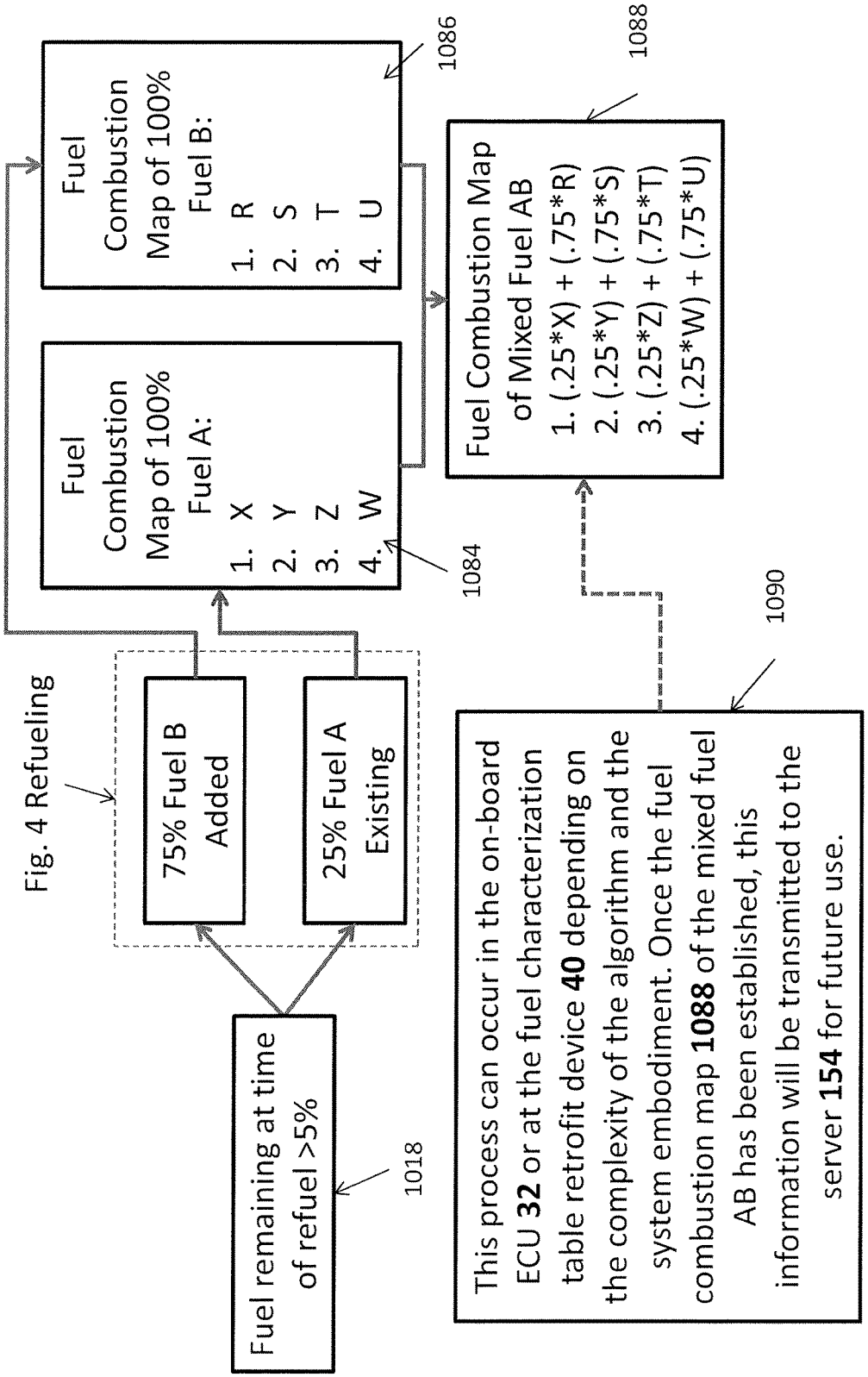
FIGURE 12: EXAMPLE OF A CALCULATED MIXED FUEL COMBUSTION MAP WITH LINEAR CORRELATION OF PROPERTIES

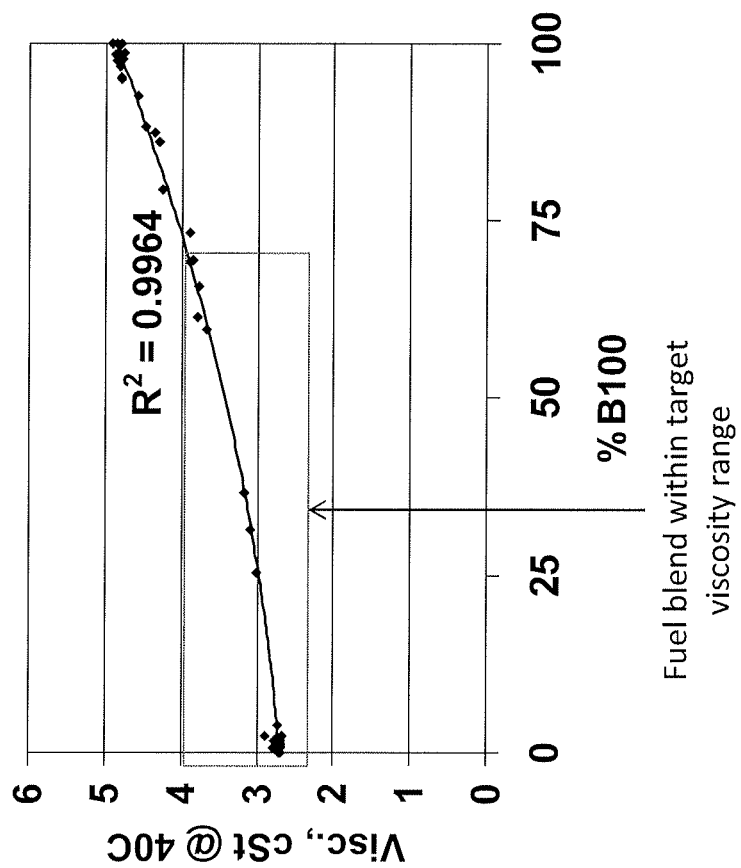
FIGURE 13: 40C VISCOSITY CURVE FOR B100/DIESEL FUEL BLEND MAP

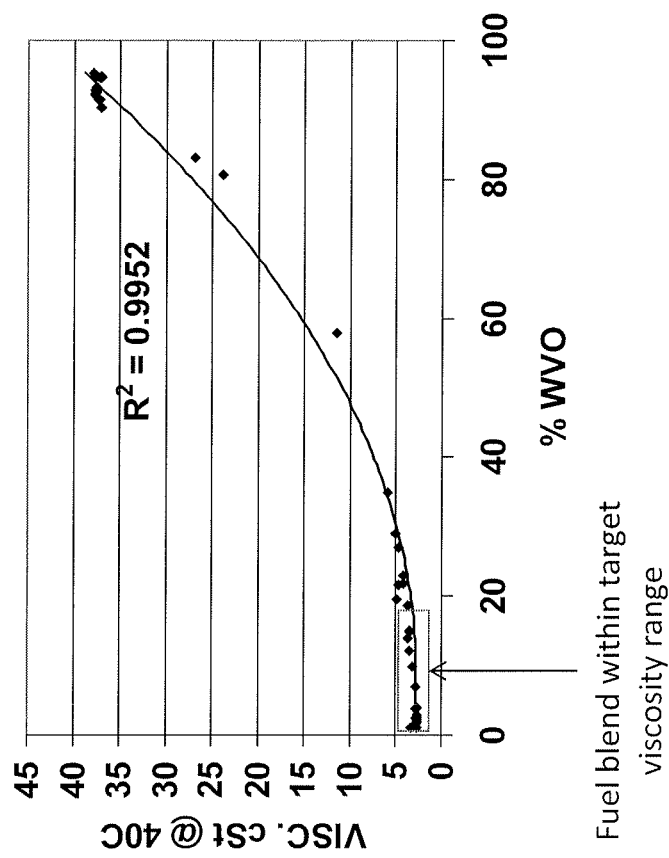
FIGURE 14: 40C VISCOSITY CURVE FOR WVO/DIESEL FUEL BLEND MAP

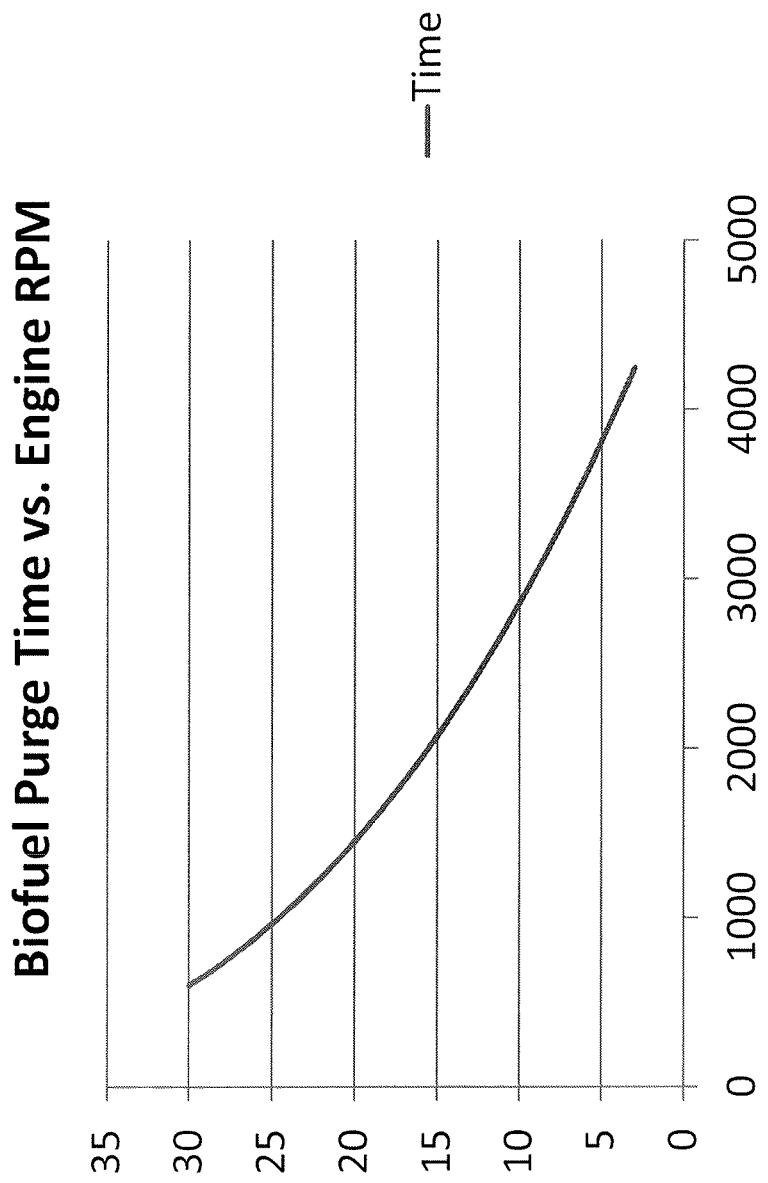
FIGURE 15: Operational Purge Specific Load vs. Purge Time Table

DYNAMIC VARIABLE FUEL OPTIMIZATION SYSTEM

CROSS-REFERENCE TO RELATED APPLICATIONS

This application is a Continuation In Part Application of International Application Serial No. PCT/US2013/040944 titled Dynamic Variable Fuel Optimization System, filed May 14, 2013, claiming priority of U.S. Provisional Application Ser. No. 61/646,423 titled Dynamic Variable Fuel Optimization System, filed May 14, 2012. In addition, this application is supplemented by and claims priority of U.S. Provisional Patent Application No. 61/903,605, titled Dynamic Variable Fuel Optimization System, filed Nov. 13, 2013, each herein incorporated by reference.

FIELD OF THE INVENTION

The present invention is related generally to the field of vehicle fuel optimization, and in particular to a system to adjust engine operation conditions based on fuel grade properties of the fuel dispensed in the vehicle's fuel tank and a system to enable use and blend traditional and alternative fuels during the operation of a vehicle.

BACKGROUND OF THE INVENTION

Current renewable fuels and fuel systems only enable the user to operate on a single biofuel/biofuel blend. Biodiesel, biofuel, renewable fuel, etc., are all used interchangeably as it relates to system descriptions and operation. Below are two examples of current systems.

Example A: The user has a stock vehicle with a single draw tank scenario. The user fills the tank with commercially available biodiesel. This biodiesel is what is available at the pump and the user has no input in this selection. In September the user fills the tank with B20 (a 20% blend of biodiesel 80% diesel) in a location where during the day the temperature averages high 60's low 70's, and at night the temperature drops into the 40's. The biodiesel fuel will begin to gel as the temperature drops. This will cause hard starts and filter clogging in the vehicle. Because this vehicle is only operating on the original equipment manufacturer's or stock fuel system, the user's vehicle would be rendered inoperable until the fuel warmed up or maintenance was performed.

Example B: The user has what is currently available as a renewable fuel system added to the stock fuel system configuration. This enables the user to operate on pure (100%) concentrations of renewable fuel because the renewable fuel system operates in auxiliary to the stock system. Traditional operation would be as follows: The user fills the vehicle's stock tank with diesel fuel and the auxiliary tank with 100% biodiesel. The engine starts and shuts down on the traditional diesel fuel system and this alleviates the issues associated with cold weather performance. As the engine warms up on diesel, the alternative fuel system is being heated. When the biofuel is sufficiently heated, the system switches over to the 100% biodiesel tank either manually or automatically depending on the system. Primarily, the fuel system components are isolated from one another so that the diesel and renewable fuel systems operate independently and do not cross contaminate. This scenario allows the user to operate on diesel or renewable fuel in an "either or" situation. The vehicle is either running on diesel or renewable fuel.

Both of these examples have significant drawbacks. A fixed fuel scenario is not ideal in most operations but it is the only available solution, and therefore standard operating procedure.

Currently, there are no automatic engine parameter adjustment systems that determine and set the optimal engine operating conditions based on specific fuel characteristics of the fuel being utilized. The commercial market is any and all combustion engines that preferably operate with some type of electronic fuel system controls. In practice, the most beneficial applications are for large volume fuel users. Some users are large heavy equipment and fleet operators that could see a significant return from these efficiency increases. For example, a user paying $4.00/gal and utilizing 25,000 gallons of fuel annually that can realize an efficiency increase of 5% by utilizing a system that optimizes fuel utilization, which is a savings of 1,250 gallons of fuel or roughly $5,000 annually. In a scenario where the fuel optimization system is being utilized to implement an alternative fuel at an estimated savings of $.50 per gallon, the cost savings annually could be $12,500 coupled with the 5% efficiency increase, the client has the potential to realize a savings of up $17,500 annually per truck. In a fleet of 100 trucks, this savings could be almost $2,000,000 annually.

Outside of the actual fuel user, the fuel producer has a significant incentive for implementation of an optimal fuel utilization system. If a fleet has a choice between Fuel A and Fuel B, where Fuel B has been characterized and is compatible with the fuel optimization system and can provide a 5% efficiency gain over Fuel A; the fleet has a much greater incentive to utilize Fuel B. This gives the Fuel Producer B a competitive edge over Fuel Producer A and locks in a long-term customer. If fuel producers are creating proprietary fuels, additives, etc. and can enhance the combustion of these by utilizing a fuel optimization system—competition is created between the producers to improve the performance of their fuels/additives and they have an incentive to implement fuel optimization systems to acquire additional clients.

SUMMARY OF THE INVENTION

The present invention is adaptable to a renewable fuel system that can automatically or manually configure a vehicle's fuel system parameters to operate on a blend of traditional/alternative fuel ranging from 0-100%, where 0% blend is 100% traditional diesel and 100% blend is 100% alternative fuel.

The present invention optimizes utilization of petroleum or bio derived fuels in various single and multi-fueled engines. The present invention can include a retrofit device to an external fuel dispensing system capable of real-time communication of fuel properties (physical, reactionary, combustion etc.) to on-board computer systems during the refueling process. The on-board computer system of the present invention can interface with the Original Equipment Manufacturer's electronic control units (if present) to adjust engine operating conditions to optimize combustion parameters of the dispensed fuel blends to increase performance, fuel efficiencies and reduce emissions.

As mentioned above, the present invention supports use of an auxiliary renewable fuel system for combustion engines by enabling engine optimization when liquid fuels from bio-mass are used. The present invention is designed to enable usage of high concentration blends of biofuel while achieving optimal emission and performance results from the engine. The system can be an auxiliary system retrofit to the stock fuel system or an integrated solution installed by the Original Equipment Manufacturer (OEM). The present invention is designed to work with a variety of fuels and is intended to be fuel neutral. Potential alternative fuels include, but are not limited to, Biodiesel, Vegetable Oil, Animal Fats, Plant Oils, Ethanol and CNG for use in both compression ignition and spark ignition engines. The system is also applicable for any type of traditional fuel such as gasoline and diesel and additives to any such type of fuel.

One embodiment of the present invention does not require the addition of additives or substances to the fuel utilized to change the fuel properties, for example heating and cooling are utilized to adjust the viscosity of the alternative fuel.

For a better understanding of the present invention, together with other and further objects thereof, reference is made to the accompanying drawings and detailed description.

BRIEF DESCRIPTION OF THE DRAWINGS

The present invention is illustratively shown and described in reference to the accompanying drawings, in which:

FIG. 1A is an exemplary illustration of comprehensive fuel characterization tables of the present invention and a database storing such tables;

FIG. 4 is a further detailed flow diagram of refueling operation of the present invention;

FIG. 8 is a diagram that shows the present invention's utilization of fuel properties to optimize driver performance through real-time feedback;

FIG. 9 is schematic logic flow diagram of how the present invention operates during a regeneration cycle in the instance that a diesel particulate filter is installed on an engine which has a renewable fuel system installed;

FIG. 10. is a diagram of a fuel tank with one embodiment of an onboard additive mixing system retrofit components installed;

FIG. 11. is a diagram that identifies one method for how the present invention utilizes fuel emission maps track and aggregate engine emission reductions;

FIG. 12. is one example of how a fuel combustion map is determined based upon a linear correlation of fuel properties.

FIG. 13. is an example of a viscosity blend curve at one temperature in a fuel blend map for a diesel/B100 (100% biodiesel) fuel blend;

FIG. 14. is an example of a viscosity blend curve at one temperature in a fuel blend map for a diesel/WVO (waste vegetable oil) fuel blend; and FIG. 15 is an example of a biofuel time vs. engine RPM plot

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all sub-ranges subsumed therein. The present invention will be described herein as a total integrated fuel injection control system installed by the Original Equipment Manufacturer. However, one skilled in the art will appreciate and recognize that certain components and sub-systems are standard equipment on current commercial vehicles, whereas other components and sub-systems are unique to the present invention and can be added or retro-fitted to cooperate with the existing fuel injection system of current commercial vehicles.

Figure 1:
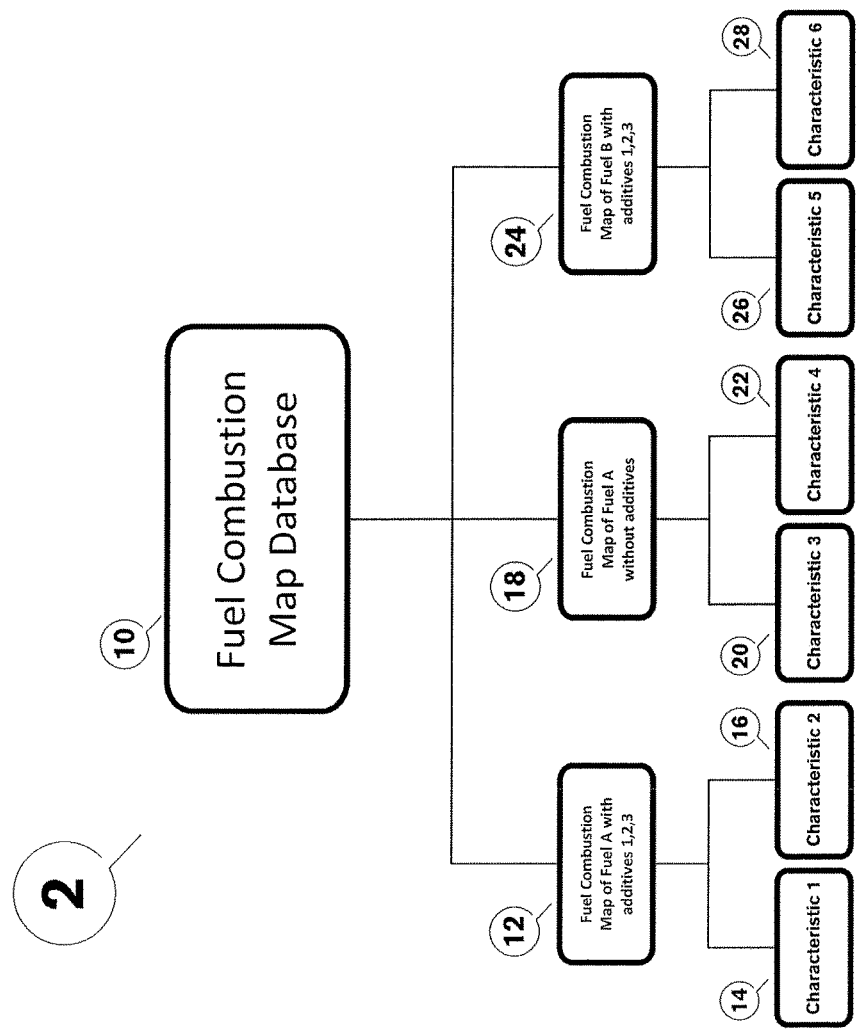
FIG. 1 is an exemplary illustration of a database storing fuel combustion maps of the present invention.
Figure 2:
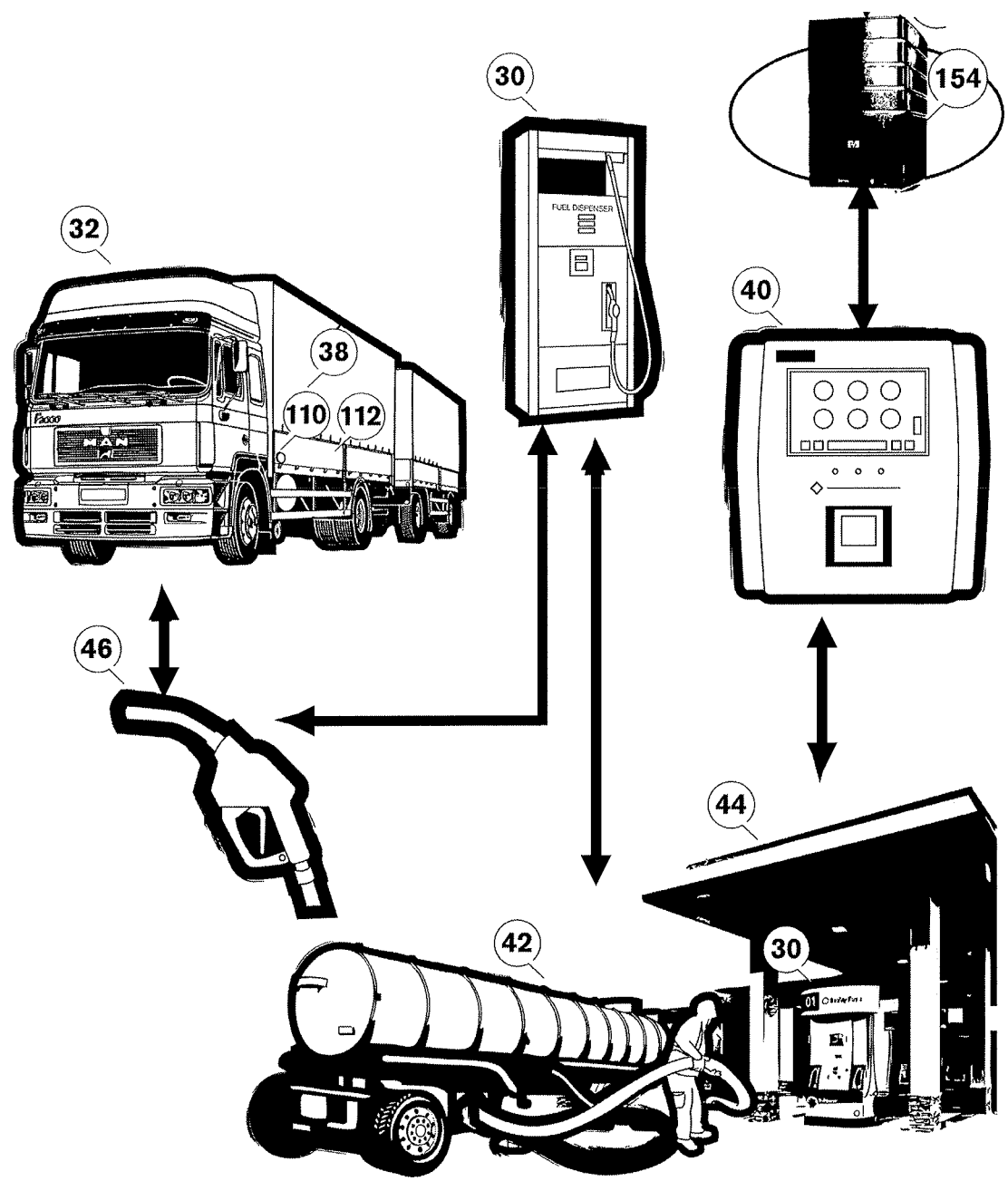
FIG. 2 is an illustration of the refueling process and system of the present invention.

Now turning to FIG. 1, the present invention 2 is adaptable to use various types of fuels where the characteristics of the fuel are represented as data in combustion fuel maps 12,18,24 stored in a Combustion Fuel Map Database 10. The example in FIG. 1 illustrates three types of fuel, though the present invention is not to be limited to any specific number of fuel maps: Fuel A with additives 1, 2, 3 (12) having combustion characteristics 1 (14) and 2 (16); Fuel A with no additives (18) having combustion characteristics 3 (20) and 4 (22); and Fuel B with additives 1, 2, 3 (24) having combustion characteristics 5 (26) and 6 (28). During refueling, the on-board Optimizing Electronic Control Unit (ECU) 32 (see FIG. 2) receives comprehensive fuel characterization data from the fuel dispensing system 30 by downloading the Comprehensive Fuel Characterization Table (see FIG. 1A) best suited for the particular fuel and particular engine model. One skilled in the art will recognize that each different type of engine may have unique fuel combustion maps and fuel emissions profiles for each fuel type. The comprehensive fuel characterization tables 210 utilize combustion maps 12,18,24 to adjust engine timing, injection cycles, exhaust gas re-circulation (EGR), and other critical engine operational characteristics in combination with the appropriate fuel system pressures, operational guidelines (start-up offsets on diesel fuel) and fuel blend maps 212, 214, 216 to adjust optimal fuel blends and performance of the renewable fuel system 156 (see FIG. 7) as determined by on-board Optimizing ECU 32 from comprehensive fuel characterization data received from the fuel dispensing system 30.

Figure 5:
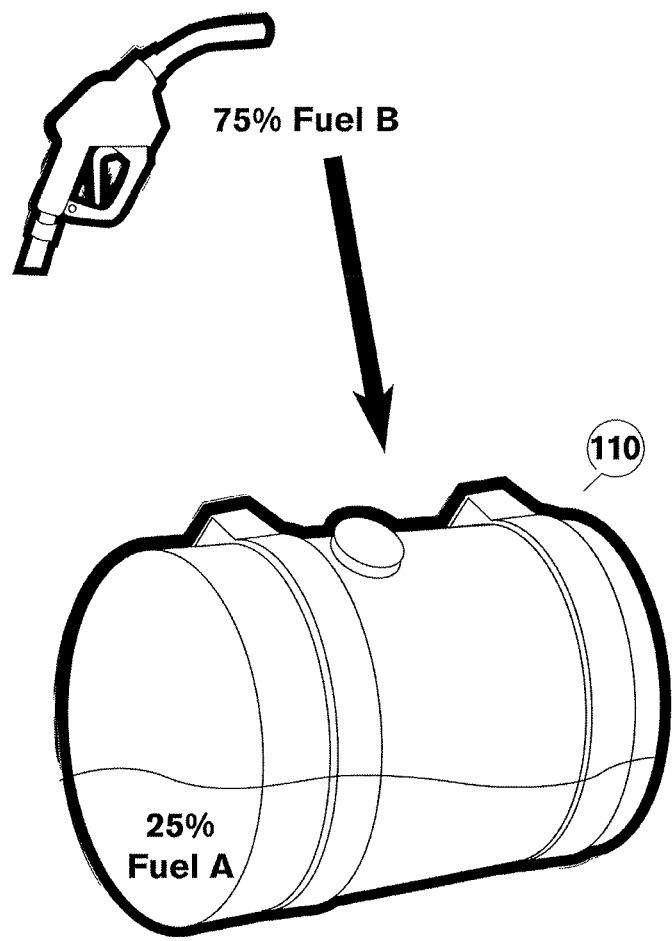
FIG. 5 is a pictorial illustrate of an example of adding 75% by volume Fuel B to a tank containing 25% by volume Fuel A.

Now turning to FIG. 5, an example of a fuel type that could be optimized by the present invention is compressed natural gas 62. Natural gas is fueled from a compressor-style fueling station, such as fuel dispensing system 30 shown in FIG. 2. These stations are supplied natural gas from the utility grid; generally speaking, natural gas is constant. There are however variations in the gas properties that can impact performance and combustion that present invention 2 can accommodate for. The present invention 2 also enables the supplier to blend an additive into the gas as it is being fueled into the vehicle and adjust the performance of the engine based on the combustion property variations of the combustion fuel maps, such as Fuel A (12) and Fuel B (24), shown in FIG. 1. The vehicle equipped with the present invention 2 will load the corresponding comprehensive fuel characterization table 210 with combustion fuel maps 12, 18, 24 having fuel characteristics 14, 16, 20, 22, 26, and 28 to ensure the maximum performance is derived from these additional additives (discussed in detail below).

Now returning to FIG. 2 for an overview of the present invention 2. One embodiment of the present invention 2 includes a fuel characterization table retrofit device 40 to fuel dispensing system 30 that communicates with vehicle on-board Optimizing ECU 32 of the present invention 2 to identify the comprehensive fuel characterization table 210 (for example including fuel combustion maps 12, 18, 24 and fuel blend maps 212, 214, 216 FIG. 1 and FIG. 1A) of the fuel being pumped into a single tank or multiple tanks 110, 112 of vehicle 38. On-board ECU 32 is an embedded system (or microcontroller) that controls, automates and optimizes the OEM fuel system and or renewable fuel system retrofit 156 (see FIG. 7). When a fuel distributor 42 delivers fuel to a fuel dispensing system 30, information such as the comprehensive fuel characterization table 210 along with the amount of fuel dispensed into the station supply or storage tank 44 is transmitted to fuel dispensing system 30. The fuel combustion maps 12,18,24 with operational characteristics for particular fuels are downloaded from the fuel characterization table retrofit device 40 to fuel dispensing system 30. A retrofit device located on nozzle 46 initiates the communication between the fuel characterization table retrofit device 40 unit of the fuel dispensing system 30 and the on-board electronic control unit (ECU) 32 to download, for example, the fuel combustion maps 12, 18, 24 having characteristics 14, 16, 20, 22, 26, and 28 to the on-board ECU 32 via connection 176, as well as downloading the quantity of fuel that was dispensed into tanks 110, 112. (Also See FIG. 7) On-board ECU 32 can modify operating parameters of the engine's fuel controller of the vehicle's ECUs 108 (see FIG. 7) through integration of the vehicle's electronic communication architecture 98 (FIG. 7) based on the operational characteristics of the fuel combustion map of the fuel pumped into tanks 110, 112 (discussed in detail below). The present invention 2 enables comprehensive optimization of combustion for any and all fuel types by enabling fuel and additive producers to create comprehensive fuel characterization tables 210 which characterize exactly how their products operate in specific engines. The on-board ECU 32 can control a variety of fuel system components such as but not limited to: pumps, heaters, blend valves etc. enabling modification of the vehicle and fuel system's standard operating conditions (discussed in detail below) to match an ideal scenario for the specified fuel's combustion map (for example, Fuel A with additives 12, Fuel A without additives 18, and Fuel B with additives 24) through integration of the vehicle's electronic communication architecture 98 based on the comprehensive fuel characterization tables 210 of fuel pumped into tanks 110,112.

Due to the variations of fuel dispensing pumps (fueling infrastructure) available at fuel dispensing systems 30, the present invention 2 will consist of hardware and software component on the on-board ECU 32 and a compatible fuel characterization table retrofit device 40 for the fueling infrastructure's dispensing system 30. The fuel infrastructure retrofit includes a nozzle communication fob or equivalent device to initiate and carry out communications with the fuel optimization ECU 32. A fuel system with multiple compatible fuel tanks 110, 112 can have a tank identification sensor to enable ECU 32 and the fuel dispensing system 30 to delineate various fuels in use in multiple tanks onboard the same vehicle. The on-board ECU 32 will communicate and detect when the on-vehicle tank 110, 112 is being refilled and receive comprehensive fuel characterization tables 210 transmitted by the fuel dispensing system's fuel characterization table retrofit device 40 as discussed above. See FIGS. 3, 4 for details of potential flow charts for this operation.

Figure 3:
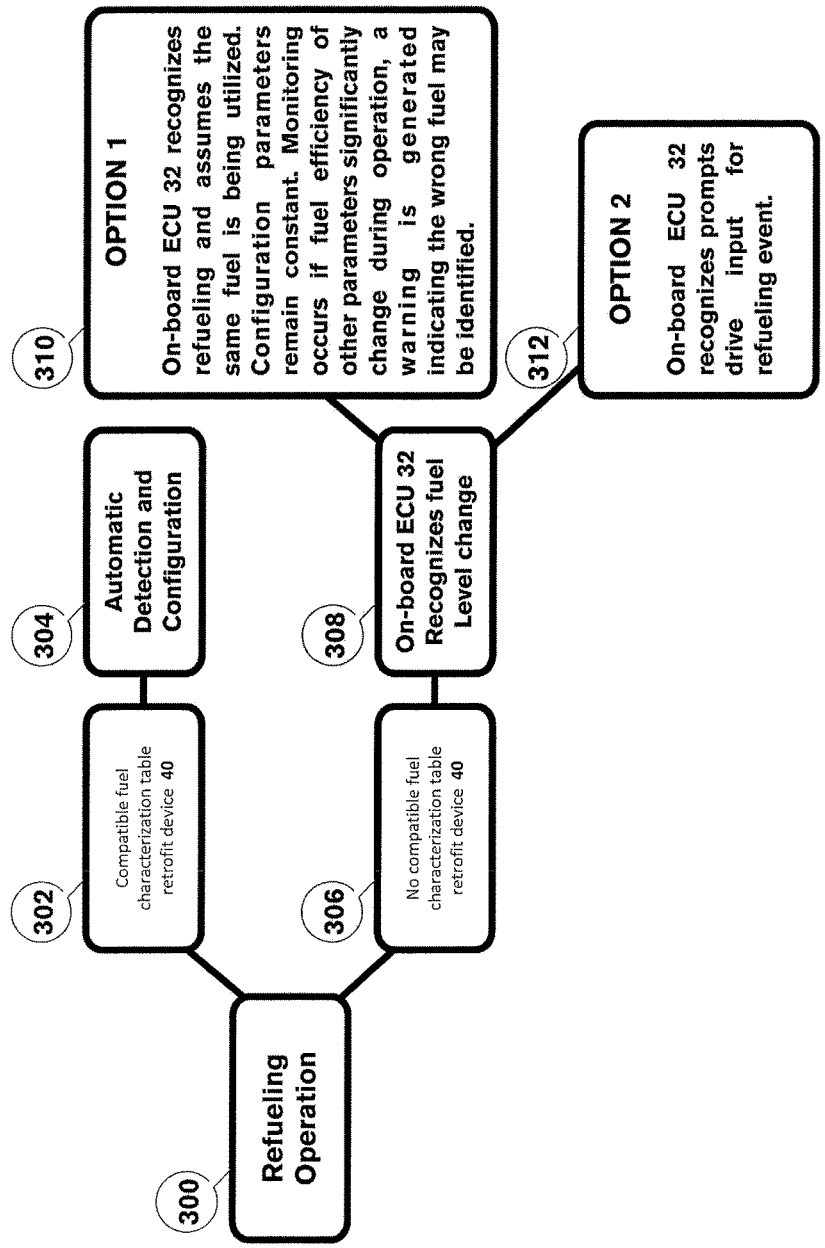
FIG. 3 is a logic flow diagram of the refueling operation interfacing with compatible and non-compatible fuel dispensing systems.

Now turning to FIGS. 3 and 4 that illustrate the automatic logic and manual process for the download of comprehensive fuel characterization tables 210 (see FIG. 1A) onto on-board ECU 32. A fuel dispensing system 30 may or may not have a fuel characterization table retrofit device 40 compatible with the present invention 2. During refueling operation 300, on-board ECM 32 will recognize whether there is or is not a fuel characterization table retrofit device 40 unit of fuel dispensing system 30. For example, one type of the vehicle sensors monitored by on-board ECU 32 are the fuel level sensors in communication with the vehicle's fuel tank or tanks 110, 112. If the fuel characterization table retrofit device 40 of fuel dispensing system 30 is available 302, then on-board ECM 32 will automatically detect and initiate configuration 304 within on-board ECU 32 of the particular fuel being dispensed in tank or tanks 110, 112, based upon comprehensive fuel characterization tables 210 which link the fuel combustion map files 12,18, 24 (see FIG. 1) of the particular fuel being dispensed to the on-board ECU 32 such that on-board ECU 32 can enable decision logic and control mechanical devices to optimize the combustion of the vehicle's engine based upon the particular fuel being utilized. If the compatible fuel characterization table retrofit device 40 of fuel dispensing system 30 is not available 306, the on-board ECU 32 recognizes that there is no communication with fuel characterization table retrofit device 40. The fuel level sensors of the vehicle in communication with on-board ECU 23 will indicate the fuel tanks are being filled 308 (fuel level sensor value has positive change). The present invention provides at least two alternative options 310, 312 to utilize the on-board ECU 32 to enable decision logic and control mechanical devices to optimize the combustion of the vehicle's engine based upon the particular fuel being utilized.

Option 1 (310): On-board ECU 32 recognizes refueling and assumes the same fuel, as was previously used in the tank, is being utilized. Configuration parameters remain constant and monitoring occurs. If parameters of the comprehensive fuel characterization tables 210 such as fuel efficiency, combustion temperatures, exhaust gas temperature, fuel rail pressure etc. change by greater than a predetermined percentage during operation, then the on-board ECU 32 generates a warning indicating the wrong fuel may be identified in the configuration of on-board ECM 32.

Option 2 (312): On-board ECU 32 prompts the driver of vehicle to input the specific fuel being dispensed into tank or tanks 110, 112. The prompt will appear on a user interface device in the vehicle either integrated into the dash board signaled through the vehicle bus 162 or a separate device 160, both in communication with on-board ECU 32.

The present invention may operate most efficiently when complete refueling is performed when switching between different types of fuels are to be used sequentially in the same tank. For example, if a driver is to change from Fuel A to Fuel B, it is best to do so at a predetermined value, for the purposes of an example <5% fuel level will be utilized. If the amount of Fuel A present in the tank is <5% when the tank is filled with Fuel B, this is considered to have a nominal impact on the parameters of the comprehensive fuel characterization tables 210. As discussed above and illustrated in FIGS. 3 and 4 if the amount of fuel remaining in the fuel tank is >5% at the point of the refueling operation, on-board ECU 32 will calculate the percentages of each fuel in the tank and adjust the comprehensive fuel characterization tables 210 accordingly to create mixed-fuel characterization tables. The predetermined value can be any value between 0% to 100% in any real or whole number, include integers, such as a value between 0.1% and 99.9% increments of 0.1% or a value between 5% to 95% increments of 5%.

Figure 6:
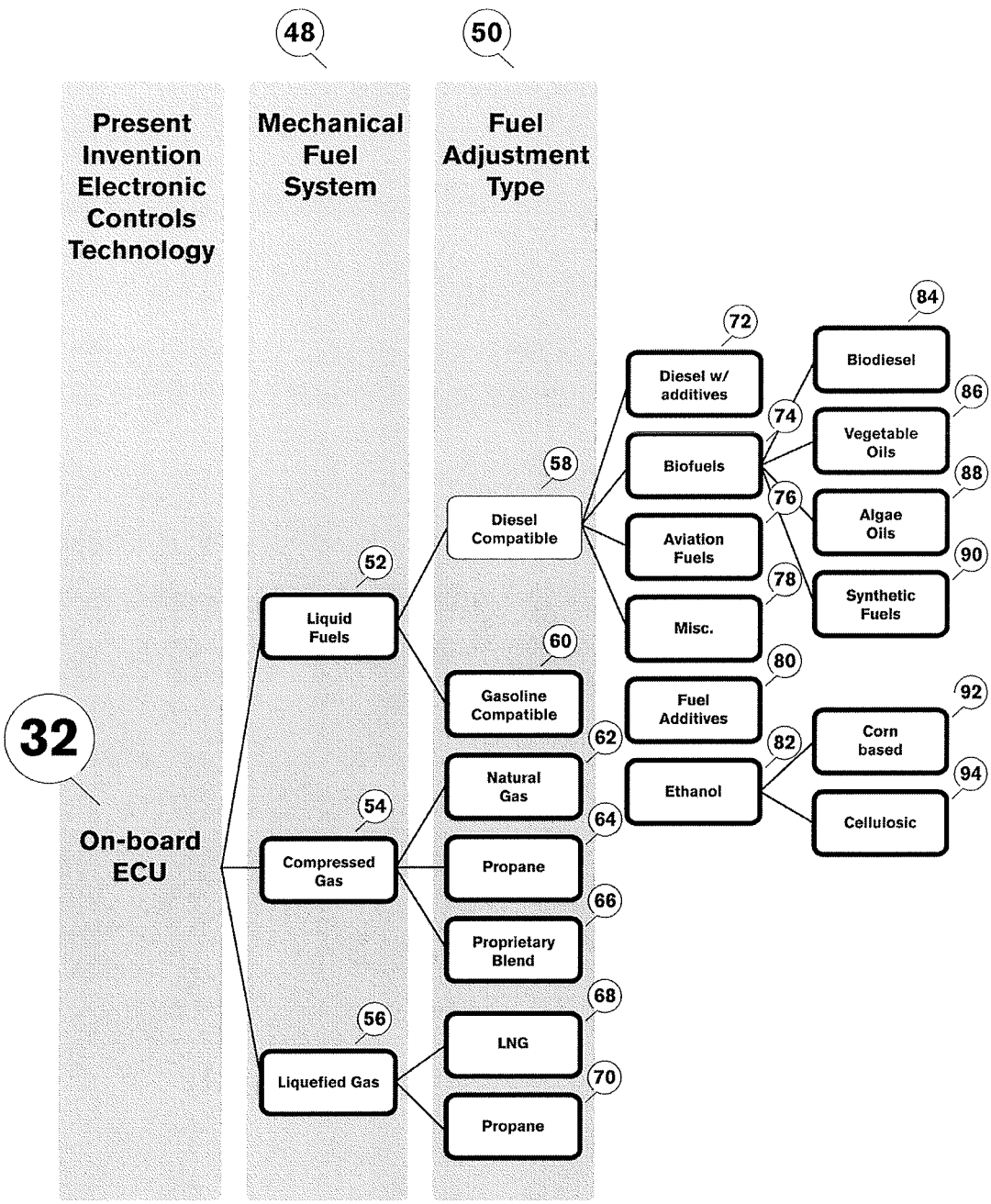
FIG. 6 is an exemplary system diagram of various examples of the capabilities of the electronic controls technology of the present invention.

Automatic Detection and Configuration of Mixed-Fuel Characterization Table Example: Relating to a fuel dispensing system 30 with fuel characterization table retrofit device 40 and referring to FIG. 6 tank 110 is filled 25% by volume with Fuel A. The remaining 75% of tank 110 is filled with Fuel B during the refueling operation. On-board ECU 32 adjusts fuel map characteristics to create a weighted fuel map with distributed properties of Fuel A and Fuel B. One example of an adjusted parameter of a comprehensive mixed-fuel characterization table is the mixed-fuel combustion map as determined in the process identified in FIG. 12. Due to the vast requirements of fully analyzing a variety of fuels and fuel mixtures in various configurations, this data may be extrapolated initially and continually refined based upon continued operational feedback.

Manual Fuel Selection Ratio Example: Fuel dispensing system 30 without a compatible fuel characterization table retrofit device 40. As discussed above, on-board ECU 32 recognizes when a tank is refilled (fuel level sensor value has positive change), and on-board ECU 32 prompts the driver to select the comprehensive fuel characterization table 210 corresponding to the fuel added during refueling. On-board ECU 32 can calculate the ratio based on remaining fuel prior to refueling (here again referring to FIG. 5, tank 110 has 25% by volume of Fuel A remaining in the tank) and the total volume after refueling is 100% (where 75% by volume of the tank 110 is filled with Fuel B during refueling). On-board ECU 32 adjusts fuel map characteristics to create a weighted fuel map with the distributed properties of Fuel A and Fuel B; again as exemplified by the process identified in FIG. 12 which shows calculation of one type of adjusted parameter of a comprehensive mixed-fuel characterization table, the mixed-fuel combustion map.

Now turn to FIG. 12 for a more in-depth explanation of the modification of one property of a comprehensive mixed-fuel characterization table, the mixed-fuel combustion map, as determined by the linear weighted fuel combustion property process 1088. 100% Fuel A has combustion properties X, Y, Z, and W which correspond respectively to 100% Fuel B combustion properties R, S, T, and U. Although one skilled in the art will recognize there are an unlimited number of formulations that can be utilized to determine the algorithms that will create weighted mixed-fuel combustion maps, a linear correlation is utilized for the sake of clarity. If 75% by volume of Fuel B is added to tank 110 filled with 25% by volume of Fuel A, as shown in FIG. 5, a weighted linear calculation occurs. For example the new fuel, mixed fuel AB, has properties: 1) (0.25*X)+(0.75*R), 2) (0.25*Y)+(0.75*S), 3) (0.25*Z)+(0.75*T) and 4) (0.25*W)+(0.75*U) to create mixed-fuel combustion map 1088. This process can occur in variety of locations including but not limited to the on-board ECU 32 or fuel characterization table retrofit device 40 depending on the complexity of the algorithm. Once the new mixed-fuel combustion map 1088 of mixed fuel AB has been established, this information can be transmitted to databases on the server 154 for future referencing.

Further Mixed-Fuel AB Combustion Map Example:
Fuel A, with target injection at 3° before top dead center (fuel tank 110 has 25% Fuel A);
Fuel B, with target injection at 5° before top dead center (fuel tank 110 has 75% Fuel B);
Weighted mixed-fuel AB target injection would be 4.5° [(0.25*3)+(0.75*5)] before top dead center (fuel tank mixed with 25% Fuel A and 75% Fuel B). The weighted mix target in this example is assumed to be a linear correlation. Other weighted mix targets can be derived based on non-linear correlations.

Figure 7:
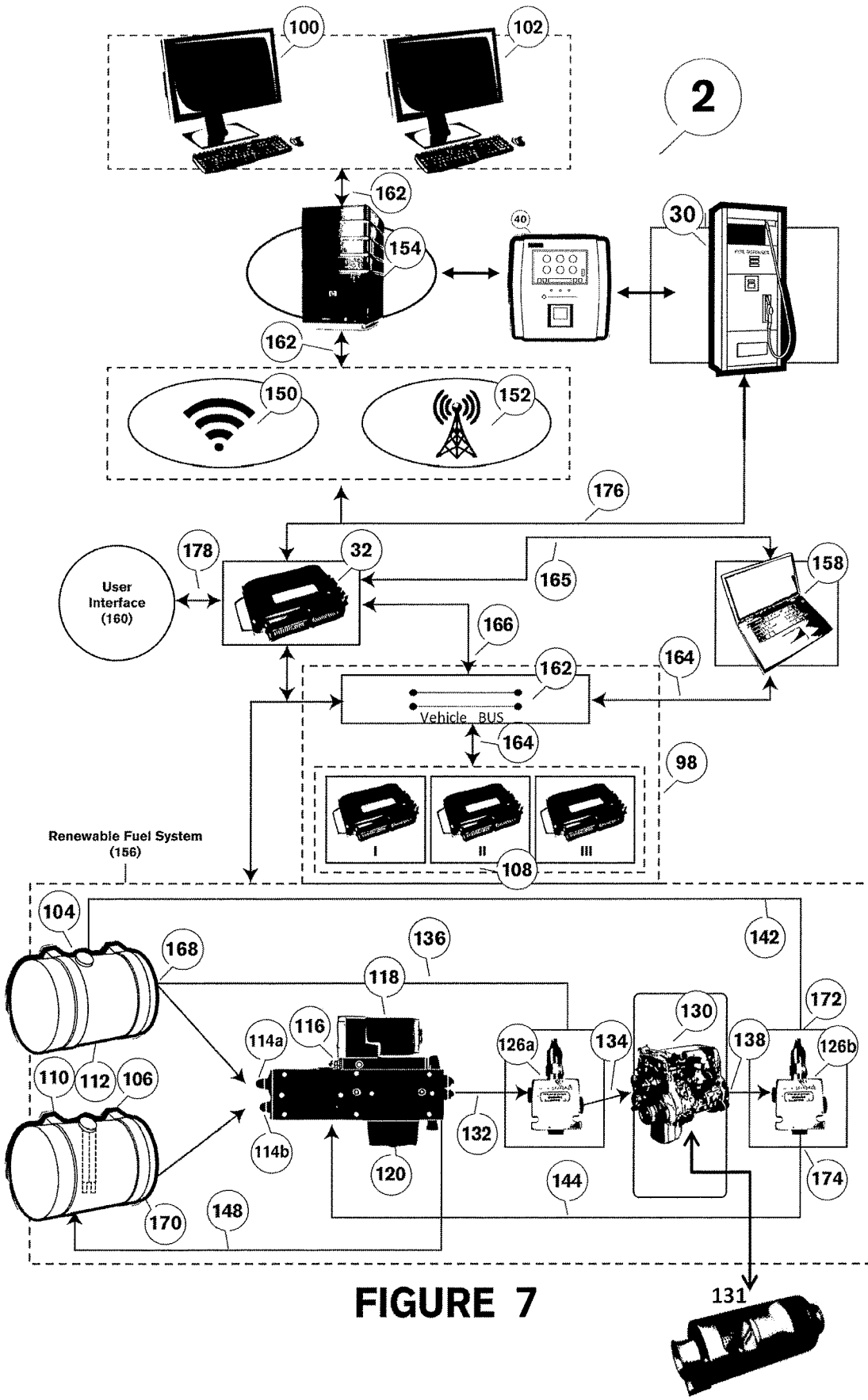
FIG. 7 is a schematic of one embodiment of the present invention comprised of internal and external communication networks to perform fuel system optimization of integrated OEM fuel system components as integrated with one embodiment of renewable fuel system retrofit components.

Now turning to FIG. 7 that illustrates diverse applications with various fuel systems capable of being handled through the integration and communication of the on-board ECU 32 with the mechanical fuel system type 48 and fuel adjustment type 50. Examples of mechanical fuel systems 48 include liquid fuels 52, compressed gas 54, liquefied gas 56, and any other currently known or future fuel sources. Fuel adjustment type 50 are possible fuel types that on-board ECU 32 can create comprehensive mixed-fuel characterization tables to adjust engine operation conditions based on fuel combustion and other identified properties in conjunction with the mechanical fuel system 48. Liquefied fuels 52 can be a mixture of diesel compatible fuels 58 and gasoline compatible fuels 60, where diesel compatible fuels 59 can include diesel with additives 72, biofuels 74, aviation fuels 76, and miscellaneous fuels 78 determined by the fuel company. Biofuels 74 can include biodiesel 84, vegetable oils 86, algae oils 88, and synthetic fuels 90. Gasoline compatible fuels 60 can include fuel additives 80 and ethanol 82. Ethanol fuel 82 can include corn-based fuel 92 and cellulosic fuel 94. Compressed gas 54 can include natural gas 62, propane 64, and proprietary blends 66. Liquefied gas 56 can include liquefied natural gas (LNG) 68 and propane 70.

Now returning to FIG. 7 for an illustration of an exemplary integration of on-board ECU 32 of present invention 2 incorporated into a vehicle's renewable fuel system 156 and electronic architecture 98 along with the communication network and server 154 linking the on-board ECU 32 with client interfaces 100 and present invention management interface 102. For this detailed example, a diesel engine will be used for illustration purposes and it is not intended to limit the present invention to only diesel engine applications. The present invention 2 includes the integration of a traditional fuel system (such as a diesel system) with an alternative fuel system (such as a biodiesel fuel system) into one integral multi-fuel system 156. As mentioned above, the present invention 2 can include an on-board ECU 32 installed in a vehicle in communication with the vehicle ECUs 108 to monitor a number of standard engine and system parameters that adapts the renewable fuel system 156 state accordingly, which is the collection of mechanical components interacting with the On-board ECU 32. One embodiment of a renewable fuel system 156 can include a heated or cooled auxiliary fuel tank 110, a heated or cooled diesel or traditional fuel tank 112, pre-filter/check valves 114A, 114B, mixing valve 116, pump 118, micronic filtration 120 and fuel selector valves 126. The system is fluidly connected to engine 130 by renewable fuel system fuel lines 132, diesel fuel supply line 136 and common fuel lines 134. The heated or cooled fuel tanks 110, 112 provide a means to adjust the viscosity of the fuel in either tanks to accommodate ambient conditions and to facilitate optimal fuel blend maps 212, 214, 216 that correspond with fuel combustion maps 10 based on comprehensive fuel characterization tables 210 (FIGS. 1, 1A) discussed above. The return fuel selector valve 126b has an input line 138 returning fuel from engine 130 and output lines 142, 144 to direct engine returning fuel to the diesel tank 112 or fuel feed point 146, respectively. Renewable fuel system 156 can also include an air bleed return line 148 from micronic filtration 120 to fuel tank 110.

A further aspect of present invention 2 is communication of system information to a remote server 154 via any number of wired or wireless transmission methods 150, 152 via connection 162. This communication enables view and control of functions and data from the on-board ECU 32 by client interface 100 and the management interface 102. The management interface 102 can maintain all collected data and system parameters in the system server 154 and provide access to this information to the client interface 100 for use by technicians (performing service, configuration, etc.),fleet managers (for data collection and analysis), fuel producers (for continued refinement of fuel combustion map properties) and others as needed for business and research activities. Application pages can include: Vehicle data download to database; charting; ECU configuration; Control/Setup mode; Real-time display of information; and on-board ECU software/system updates.

As discussed above, a basic function of the present invention 2 is to optimize a renewable fuel blend. This can be done in any number of ways. One example is by adjusting the viscosity of the alternative fuel 106. One embodiment of the on-board ECU 32 of the present invention 2 monitors system parameters of the renewable fuel system 156 including the temperature of the fuels in tanks 110, 112 to activate heaters or coolers in tanks 110, 112 to mechanically adjust the viscosity of the fuels to meet parameters of the optimum combustion characteristics as defined by the fuel combustion maps 12, 18, 24. For example, the alternative fuel 106 in auxiliary tank 110 can be heated based on the parameters identified in the comprehensive fuel characterization tables 210 (see FIG. 1A) in the on-board ECU 32 to reduce the alternative fuel viscosity to the level of the traditional fuel designed for used in the vehicle, such that the spray pattern of traditional fuel (for example, petroleum diesel) is replicated by the alternative fuel 106 (for example, biodiesel) during injection enabling the best emissions and performance of the engine. Additionally, another method for viscosity adjustment includes the traditional or diesel fuel 104 in tank 112 be blended into the renewable fuel at blending valve 116 based on fuel blend maps 212, 214, 216 in the comprehensive fuel characterization tables 210 and on-board ECU 32. Blending to reduce the alternative fuel's viscosity to accommodate current operating conditions enables on-board ECU 32 to optimize fuel usage based on the fuel blend maps 212, 214, 216 which adjust the viscosity of the fuel based on temperature and blend percent of fuel. Fuel blend maps 212, 214, 216 allow for calculation of the optimal fuel blend and enable the engine to utilize the greatest renewable fuel concentration possible for the real-time operating conditions.

FIGS. 13 and 14 show variations of this embodiment utilizing 100% biodiesel (B100) and waste vegetable oil (WVO). These fuels have varying viscosities based upon temperature and amount of traditional diesel blended into the fuel. The present invention allows blending valve 116 to mix fuel from the renewable fuel tank 110 with fuel in the traditional diesel tank 112. One example would be to seek a target viscosity of 2-4 cSt (viscosity of traditional diesel at 40 C). One embodiment of renewable fuel system 156 blending WVO with diesel to reach a homogenous mixture with a viscosity of approximately 4 cSt at 40 degrees C. utilizes fuel blend maps 212, 214, 216 for calculation of blend percentage. One example of the WVO/diesel fuel blend map characteristics are identified in FIG. 14. At 40 C WVO can be suitably mixed into diesel in concentrations up to 18% (82% diesel). This blended fuel, in turn, matches the target viscosity identified (4 cSt) and by result has suitable fuel transfer properties, a similar atomization spray pattern from injectors and can more completely achieve injection characteristics as identified by fuel combustion maps 12, 18, 24. Now turning to FIG. 13, the upper limit of B100 concentration (to achieve a target viscosity of 4 cSt at 40 C) mixed into diesel is approximately 70% (30% diesel). Maximum blend configurations for utilization in fuel blend maps 212, 214, 216 are determined for all operational temperature ranges (40 C has been selected as one example of a complete profile). One skilled in the art will recognize additional properties can be analyzed to derive a more robust fuel blend map.

One example of operation of the system implementing blending valve 116 functionality is: as the engine 130 warms up on a summer day, it may be operating on a 60% biofuel blend as determined by fuel blend maps 212, 214, 216, where the same engine 130 and fuel combination will operate on a 25% blend on a winter day based on the same fuel blend maps 212, 214, 216. The on-board ECU 32 can also adjust for barometric pressure, humidity, and load conditions. All of these factors can affect the performance, combustion and emissions of the engine and are collectively represented by the comprehensive fuel characterization tables 210. The on-board ECU 32 processes inputs from the Vehicle's ECU 108 and the renewable fuel system 156 in real time to determine on a second-by-second basis the appropriate blend of non-traditional or alternative fuel (for example, biofuel) as identified by fuel blend maps 212, 214, 216. The on-board ECU 32 in communication with the vehicle's ECU 108 adjusts parameters based upon the most current fuel combustion map in the comprehensive fuel characterization tables 210 as provided during refueling through fuel characterization table retrofit device 40. This enables functional adjustments of the timing, injection, exhaust gas recirculation and a plethora of other engine parameters of engine 130 to optimize the combustion of biofuel. This optimization can occur in a variety of ways. Two examples are that the vehicle ECU signals from the vehicle ECUs 108 can be redirected through the on-board ECU 32 for modification and transmission from on-board ECU 32 or the onboard ECU 32 can overwrite/reflash the engine's ECU 108 so that the optimized signals are embedded within and sent from the original ECUs 108 rather than being routed through ECU 32.

As discussed above, the on-board ECU 32 can detect the type of fuel being utilized thorough fuel characterization table retrofit device 40. Algae Oil, Soybean Oil, Animal Fat based Biodiesel or any other fuel that can defined and programmed into the on-board ECU 32 and fuel combustion maps 12, 18, 24 (or engine parameters) can be optimized by the present invention. Each of these fuels has unique combustion properties, identified in fuel combustion maps 12, 18, 24, that the renewable fuel system 156 can accommodate and optimize in real time.

The on-board ECU 32 receives real time dynamic feedback (e.g., ambient and engine conditions) from vehicle ECUs 108 and blends the alternative fuel 106 in auxiliary tank 110 with traditional fuel 104 in traditional fuel tank 112 (such as diesel fuel) in a range of 0-100%. This blend ratio is adjusted at blend valve 116 based on upon predetermined fuel blend maps 212, 214, 216 (see FIG. 1A) programmed into the software of on-board ECU 32. These fuel blend maps 212, 214, 216 can be optimized based upon the specific properties of the alternative fuel 106. See FIGS. 13, 14 for examples of calculating fuel blend maps 212, 214, 216 based on varying viscosities as determined by temperature and amount of traditional diesel blended into the fuel.

System Terms:

Fuel Combustion Map—Engine specific combustion parameters based upon predetermined fuel specific combustion parameters Fuel Emissions Profile—Engine specific emission parameters based upon fuel specific operational parameters Fuel Blend Map—Fuel specific parameters based upon temperature, viscosity and other parameters of varying blend percentages of two or more fuels Comprehensive Fuel Characterization Table—A compilation of Fuel Combustion Maps, Fuel Emissions Profiles, Fuel Blend Maps and other quantified parameters of a specific fuel Fuel Flow Rate Sensors (not shown)—These sensors monitor the fuel flow rate of the system. One sensor is located in the fuel supply (tank outlets 168, 170) and one sensor is located in the fuel return outlets 172, 174; this gives the system the ability to calculate fuel flow and consumption.

EGT Sensor (not shown)—The Exhaust Gas Temperature (EGT) sensor is a pyrometer located in the engine's exhaust manifold (not shown) to determine the temperature of combustion. There is one EGT sensor in the main system and an auxiliary module with EGT sensors for each individual cylinder from 1-12.

Temperature Sensors (not shown)—The heart of the blending valve system operation is based upon fuel viscosity and thus temperature. Temperature sensors can be placed in various points throughout the fuel system to accurately monitor the fuel temperature of the system. (e.g. fuel tank, fuel lines, blending valves, filter, engine input, engine output).

Fuel Selector Valves 126—These valves are on/off valves that determine supply and return status of the fuel system.

Blending Valve 116—This valve is a valve that blends diesel and biofuel.

Fuel Level sensor (not shown)—The fuel level sensors monitors fuel levels of both the diesel and biofuel tank.

As mentioned above, on-board ECU 32 can monitor and control an engine's combustion parameters and the operational characteristics of the primary fuel system (such as traditional fuel tank 112 and up-stream and down-stream components of engine 130) and a secondary fuel system (such as auxiliary fuel tank 110 and up-stream and down-stream components of engine 130).

In operation, it is undesirable with various biofuels to utilize biofuels in an engine before it has come to operational temperature. During "cold" operation, the piston rings are not fully expanded (sealed). During startup and "cold" operation, fuel bypasses the rings and is deposited in small concentrations in the crankcase oil. With traditional petroleum distillates, this is not a significant issue, as they will evaporate during operation. With some biofuels, evaporation from the crankcase oil does not occur as readily and the result is a buildup of biofuel concentration in the crankcase oil. Having significantly different properties than the petroleum distillates, the biofuels tend to polymerize under the conditions the crankcase oil is subjected to. This polymerization can lead to catastrophic engine failure as the crankcase oil begins to degrade and polymerize as a result of this reaction. To minimize crankcase oil fuel contamination, on-board ECU 32 accommodates for start-up offsets as identified by parameters in the comprehensive fuel characterization tables 210—the engine will begin to operate on traditional fuel until the desired operating parameters are met. Once the engine has come to operating temperature, the piston rings are sufficiently sealed and the possibility for fuel to bypass the rings is significantly minimized, on-board ECU 32 will switch to biofuel usage.

In addition to the above mentioned features, the present invention 2 has a user interface 160 in communication with on-board ECU 32 via connection 178 that will enable real time transmission of feedback and system performance to the driver. This is specifically valuable as it pertains to driver operation. The system is able to calculate real time efficiency and provide this information back to the driver; the system also provides a variety of other feedback to optimize efficient driving behavior such as warnings for hard braking, acceleration and cornering. As an example: Referring to FIG. 8 for an illustration, fuel A's fuel combustion map 1084 (FIG. 12) identifies that fuel A operates most efficiently at 3500 RPMs where Fuel B's fuel combustion map 1086 (FIG. 12) identifies that fuel B operates most efficiently at a higher 4500 RPMs. The differences here may be only the addition of a fuel additive or these may be two completely different fuels (e.g., Diesel and Biodiesel). The present invention 2 characterizes the fuel to enable the system to provide feedback to the driver based on the desired operating parameters of the specific fuel. These fuels as identified by fuel A 1048 and fuel B 1050 when mixed at a 50-50 ratio into fuel tank 1046. The optimizing ECU 32 recognizes the fuels and their associated parameters from the comprehensive mixed-fuel characterization tables 210 and gives feedback via User Interface 160 to suggest the driver maintain operation in a range of 4000 RPMs 1052 (average of 3500 and 4500 RPMs).

Now returning to FIG. 7, on-board ECU 32 communicates with bus system 162 in addition to renewable fuel system 156. The basic theory of operation is that the vehicle will start on diesel (or other traditional fuel) and run until the operating parameters are met, at which point on-board ECU 32 engages renewable fuel system 156. Upon engine shutdown, if the engine 130 is still operating on the renewable fuel system 156, on-board ECU 32 will engage a purge cycle to clear out the engine and injectors of alternative fuel 106. Purge cycles are determined at the time of installation and are engine specific.

Vehicle ECUs 108 represents any electronic control unit tied into the Vehicle's Bus system 162. The Vehicle Bus 162 is an internal communication network that has been created to tolerate conditions found in vehicles. The vehicle bus system 162, or central network, interconnects multiple ECU modules 108 inside a vehicle with each ECU specific mechanical components related to its function. Once connected to the vehicle bus system 162, the vehicle ECU modules 108 can communicate with other modules as necessary using a standard protocol.

There are several different vehicle bus protocols:

J1939 is a standard that is an adaptation of CAN for agricultural and commercial vehicles. CAN (controller area network) is a message based protocol originally designed to interconnect automotive components but is now also found in other applications such as marine propulsion and power generation. OBDII standard specifies the properties of the OBDII connector as well as a messaging format (OBDII protocol) for gaining access to vehicle information.

The OBDII protocol provides a messaging format for requesting data from the vehicle ECU modules 108. It provides a list of potential parameters which could be monitored along with how to encode data for each. The general protocol defines a base group of engine sensors and parameters that have "open access." Manufactures may extend the list to include proprietary parameter data. The standard also provides an extensible list of Diagnostic Trouble Codes (DTC).

The on-board ECU 32 can utilize a standard J1939/OBDII→USB cable 164 to connect the Technician Computer 158 to the Vehicle Bus system 162 to access and modify the on-board ECU 32. For an isolated operation mode, the on-board ECU 32 can be linked directly to the Technician Computer 158 via a cable 165.

Operational Modes of the On-Board ECU 32

There are two main and two sub-operation modes. The two main operating modes are Isolated and ECU Linked, and the two sub-operating modes of the controller are Static and Dynamic. In ECU Linked mode, the On-board ECU 32 will communicate with the vehicle ECUs 108. In the Isolated mode, the On-board ECU 32 operates independently of the engines systems VEHICLE ECUs 108 with no conditions for outside variables. In static mode, the biofuel system provides a single fuel. In dynamic mode, the biofuel system can mix at any blend to achieve optimal performance as determined by fuel blend maps 212, 214, 216. For example:

Isolated—Static Mode: On-board ECU 32 reads in all sensors in renewable fuel system 156 and utilizes on/off fuel selector valves 126A to switch between blended fuel and 100% diesel fuel. This is typically utilized when implementing the system is a non-electronically controlled engine (e.g., no vehicle ECUs 108) for use with multiple fuels.

Isolated—Dynamic Mode: On-board ECU 32 reads in all sensors in renewable fuel system 156 and utilizes blending fuel valves 116 to optimize the fuel blend. This mode is designed to optimize fuel use based solely on basic fuel properties and does not optimize engine performance based on known fuel combustion maps 12, 18, 24.

ECU Linked—Static Mode: This is utilized for modern electronic controlled engines (e.g., with vehicle ECUs 108) and is linked to the vehicles CAN network such as J1939, J1708, OBDII or other systems to extract, transmit and monitor data collected and stored in vehicle ECUs 108. This data will be utilized in the system's decision-making logic of On-board ECU 32 to activate on/off fuel selector valves 126A to switch between blended fuel and 100% diesel fuel.

The on-board ECU 32 also can detect when a Diesel Particulate Filter 131 equipped engine engages the "regeneration" cycle and will default the system back to traditional diesel. A Diesel Particulate Filter (DPF) 131 (FIG. 7) is connected to the tailpipe of a diesel vehicle and mechanically filters particulates from tailpipe emissions. At varied intervals, the DPF 131 will become clogged with particulate matter and engage in a "regeneration" cycle which utilizes fuel to increase the exhaust temperature and burn off the clogged particulates. Similar to the start-up offsets, there is preliminary speculation that a Diesel Particulate Filter's 131 regeneration cycle is not optimally designed for use with nontraditional fuels. The on-board ECU 32 enables the present invention 2 to disengage the nontraditional or alternative fuel during a regeneration cycle to optimize its effectiveness and then reengage once normal operation resumes. See FIG. 9 for an illustration of this embodiment for an engine adapted with a two tank renewable fuel system such as the one depicted in FIG. 7. The engine 130 is operating on up to 100% blend of biofuel in Tank 110 depicted in 1054. The DPF 131 sensor data is communicated to the Vehicle Bus 162 which is monitored the Optimizing ECU 32 through operation 1056. If DPF regeneration is not occurring, the system continues on "normal" operation. If DPF regeneration mode begins 1058, the fuel mix is switched to diesel only fuel in tank 104 and the system operates on the traditional diesel system until the regeneration mode is completed 1066 at which point the system resumes normal operation 1054.

ECU Linked—Dynamic Mode: This is the ideal and optimal operational mode of the present invention 2. In dynamic mode, the On-board ECU 32 controls a variety of electronic and mechanical controls to achieve the absolutely optimal conditions for combustion (discussed in more detail below). The on-board ECU 32 controls fuel blending valve 116 to blend fuel or additives in any percentage to achieve the ideal result as determined by comprehensive fuel characterization tables 210 (See FIG. 1A). One embodiment of additive blending is shown in FIG. 10. One embodiment of the system enables additives to be blended into fuel (diesel, natural gas, etc.) from 0% to 99% utilizing pre-filter/check valves 114 A,B and mixing valve 116 as determined by comprehensive fuel characterization tables 210.

Another embodiment of the present invention includes a Technician Mode. This is an external computer interface 164 that enables a technician to program, extract data, log maintenance and troubleshoot system performance.

Another embodiment of the present invention includes Remote Firmware Upgrade. System management 102 enables software updates to the on-board ECU 32 via wireless connection 150 or cellular connection 152.

Another embodiment of the present invention includes GPS. Mapping and navigation software can be embedded into the on-board ECU 32 and linked to an embedded database of alternative fueling stations to give access to a variety of fuels when available. This feature can be linked to the fueling stations utilizing the fuel characterization table retrofit device 40 to self-populate and identify exactly what type of fuel is available.

All system data is accessible for monitoring and troubleshooting in real-time by plugging a user interface 160 (such as a laptop) into the on-board ECU 32. This data can be viewed in the form of numerical data, graphical representation, a cockpit simulation or any split screen combination.

In response to a fault condition or system shutdown the renewable fuel system 156 will run a purge cycle. During the purge cycle, renewable fuel system 156 will switch back to diesel operation and clear the lines 132 of biofuel. There are two types of purge cycles Idle and Operational. At idle the engine 130 consumes much less fuel than when the system is operating. The purge timing for Idle purge will be set at installation, if the purge is engaged when the engine 130 is operating within 10% of the engine idle, vehicle ECUs 108 will send a signal to on-board ECU 32 and on-board ECU 32 will control the fuel valves 126A, 126B to start the Idle purge. If the engine 130 is not within idle parameters, vehicle ECUs 108 will send a signal to on-board ECU 32 and on-board ECU 32 will start the Operational purge. The Operational purge utilizes a shorter, compensated purge time depending upon the engine load and determined based upon an engine specific load vs. purge time table one example is illustrated in FIG. 15. In ECU Linked systems, the extended purge cycle will raise engine idle a programmable amount (for example between 2-5 times that of idle) to ensure complete elimination of biofuel from the injectors.

The present invention can respond to fault conditions including but not limited to the following faults:

If the renewable fuel system 156 fuel temperature drops below the preset acceptable temperature, and therefore is outside of the define fuel blend maps 212, 214, 216, the on-board ECU 32 will initiate a purge cycle.

If the exhaust gas temperature drops below the preset acceptable temperature, the on-board ECU 32 will initiate a purge cycle.

If the biofuel level drops below the preset acceptable level, the on-board ECU 32 will initiate a purge cycle.

When the engine 130 is at idle for the preset amount of time, the on-board ECU 32 will initiate a purge cycle. The on-board ECU 32 will raise the engine load prior to initiating a purge to extend the time of operation on biofuel.

If the engine 130 initiates a Diesel Particulate Filter (DPF) 131 regeneration, the on-board ECU 32 will initiate a purge as illustrated in FIG. 9.

Gallons Displaced Web App—The Optimizing ECU 32 can have the ability to identify the fuel being used by data in the comprehensive fuel characterization tables 210 and track the amount consumed 1076. For example, total Biofuel consumed will be logged by the on-board ECU 32, as this information is downloaded to the Management Server 154 and Client Application, this data will be accessible to a "counter" on the client's website. As biofuel consumption numbers increase this will show users at the clients' websites their petroleum mitigation and emission reduction statistics.

This feature can also be linked to carbon mitigation metrics for use in carbon aggregation projects and for salable carbon credit programs. Each fuels' emissions properties are loaded onto the optimizing ECU 32 as part of the fuel emission profiles 224 in the comprehensive fuel characterization tables 210. As emission standards become stricter, tracking of engine specific emission sources will become increasingly critical. By tracking the real-time fuel combustion maps 12, 18, 24 and correlating these with the fuel consumed, emission performance characteristics from fuel emission profiles 224, overall emission reductions can be interpolated and recorded. Emission reductions, such as carbon, may have value on a salable market. This information is transmitted to a remote server 154 and uniquely serialized. These uniquely identified emissions are then aggregated in various forms and may be presented to market for sale. Once these offsets have been purchased the unique serial numbers are identified as utilized and are no longer salable. FIG. 11 illustrates one example of this embodiment.

To summarize, the overall goal of the system is to characterize the optimal fuel combustion and efficiency characteristics of a fuel and the driver behavior. In one embodiment of the present invention 2, this information is embedded into the fuel characterization table retrofit device 40 at the fueling infrastructure and transmitted to the on-board ECU 32 during refueling. With this information and the identification of the specific engine that is being refueled, on-board ECU 32 can calculate and utilize the optimal engine timing and operational parameters, as identified incomprehensive fuel characterization tables 210 discussed above. In addition, through the user interface 160, on-board ECU 32 can provide real time feedback to the driver to ensure that these efficiencies are being maximized to the fullest extent possible. The data logging and connectivity of the system to a central server 154 enables constant improvement of the operating characteristics through comprehensive fuel characterization tables 210 based upon real operational scenarios and also provides fleet managers the ability to monitor, track and rate the performance of various fuels, engines and drivers.

Although the present invention has generally been described in terms of specific embodiments and implementations, the present invention is applicable to other methods, apparatuses, systems, and technologies. The examples provided herein are illustrative and not limiting, and other variations and modifications of the present invention are contemplated. Those and other variations and modifications of the present invention are possible and contemplated, and it is intended that the foregoing specification and the following claims cover such modifications and variations.

We claim:

1. A method of providing a blended fuel having a desired viscosity in an engine of a vehicle, said engine having a fuel system, said fuel system and said engine being responsive to an OEM electronic control unit said blended fuel including a first amount of a first fuel and a second amount of a second fuel, the amounts comprising a blended fuel ratio, said method comprising the steps of:
   a) providing said vehicle with a first fuel container for containing said first fuel, a second fuel container for containing said second fuel, and an optimizing electronic control unit in communication with said OEM electronic control unit and said fuel system, said optimizing electronic control unit having a microcontroller and a database, the database including fuel combustion maps for said first fuel and said second fuel such that said optimizing electronic control unit directs said OEM electronic control unit to direct the fuel system to at least one of (a) modify the blended fuel ratio or (b) change the temperature of the first fuel to cause the blended fuel to have the desired viscosity in response to real time engine conditions, air temperature, humidity, barometric pressure, and load conditions;
   b) initiating and continuing intercommunication among said optimizing electronic control unit, said OEM electronic control unit, and said fuel system such that said optimizing electronic control unit and said OEM electronic control unit continuously determine and provide blended fuel with the desired viscosity for combustion by said engine;
   c) delivering said blended fuel for combustion in said engine through said fuel system; and
   d) operating said engine using said blended fuel.

2. The method of claim 1 wherein the first fuel is an alternative fuel and said second fuel is diesel fuel.

3. The method of claim 1 wherein said fuel system includes a fuel blending valve and said first and second fuel containers are in fluid communication with said fuel system by way of said blending valve.

4. The method of claim 1 further comprising identifying and logging the type and amounts of said first fuel being used to enable calculation of petroleum mitigation and emission reduction information.

5. The method of claim 1, wherein the method further comprises downloading, from an external fuel dispensing system, at least one of a fuel type and a fuel combustion map for a new fuel to the optimizing electronic control unit from an external fuel dispensing system or, if the fuel type or combustion map cannot be downloaded from the external fuel dispensing system, manually inputting the fuel type to said optimizing electronic control unit.

6. The method of claim 1 wherein the desired viscosity is that of diesel fuel.

7. The method of claim 6 wherein the viscosity of the first fuel and the second fuel can be adjusted by heating or cooling.

8. The method of claim 6 wherein the second fuel is diesel fuel and the viscosity of the first fuel is adjusted by blending a predetermined amount of the second fuel into the first fuel.

* * * * *